(12) United States Patent
Hill

(10) Patent No.: US 10,610,444 B2
(45) Date of Patent: Apr. 7, 2020

(54) MASSAGE SYSTEM

(71) Applicant: Gary Hill, Newton, GA (US)

(72) Inventor: Gary Hill, Newton, GA (US)

( * ) Notice: Subject to any disclaimer, the term of this patent is extended or adjusted under 35 U.S.C. 154(b) by 133 days.

(21) Appl. No.: 15/992,181

(22) Filed: May 30, 2018

(65) Prior Publication Data

US 2019/0365597 A1    Dec. 5, 2019

(51) Int. Cl.
*A61H 15/00* (2006.01)
*A61G 13/00* (2006.01)
*B25J 11/00* (2006.01)
*A61H 23/02* (2006.01)

(52) U.S. Cl.
CPC ....... *A61H 15/0078* (2013.01); *A61G 13/009* (2013.01); *B25J 11/008* (2013.01); *A61H 23/02* (2013.01); *A61H 2015/0007* (2013.01); *A61H 2201/0138* (2013.01); *A61H 2201/0192* (2013.01); *A61H 2201/1659* (2013.01); *A61H 2201/5023* (2013.01); *A61H 2205/081* (2013.01)

(58) Field of Classification Search
CPC ................ A61H 15/0078; A61H 23/02; A61H 2015/0007; A61H 2201/0138; A61H 2201/0192; A61H 2201/1659; A61H 2201/5023; A61H 2205/081; A61G 13/009; B25J 11/008
See application file for complete search history.

(56) References Cited

U.S. PATENT DOCUMENTS

| | | | | |
|---|---|---|---|---|
| 2,461,102 A | * | 2/1949 | Ackerman | A61H 15/0078 601/99 |
| 4,875,470 A | * | 10/1989 | Cotone | A61H 15/0078 601/117 |
| 5,022,386 A | * | 6/1991 | Kuniskis | A61H 15/0078 601/117 |
| 5,101,835 A | * | 4/1992 | DelRe | A61B 5/1077 33/512 |
| 5,501,658 A | * | 3/1996 | Frye | A61H 15/0078 601/84 |
| 2007/0282228 A1 | * | 12/2007 | Einav | A63B 21/4021 601/33 |
| 2017/0266077 A1 | * | 9/2017 | Mackin | A61H 15/0078 |
| 2018/0036197 A1 | * | 2/2018 | Khansari | A61H 15/02 |

* cited by examiner

*Primary Examiner* — Steven O Douglas

(57) ABSTRACT

A massage system having a massage table, support members and a massage machine is disclosed. The massage table may securely attach to the massage machine by the support members. Attachment members that massage the user's body are preferably different roller type attachments of different sizes. Multiple rollers may be attached to the massage machine one at a time. A user may select from different massage treatment options by a control panel. The user may lie face down on the massage table and the massage machine will provide a soothing back massage corresponding to the option they chose.

15 Claims, 10 Drawing Sheets

MASSAGE SYSTEM

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR 1.71(d).

BACKGROUND OF THE INVENTION

The following includes information that may be useful in understanding the present invention(s). It is not an admission that any of the information provided herein is prior art, or material, to the presently described or claimed inventions, or that any publication or document that is specifically or implicitly referenced is prior art.

1. Field of the Invention

The present invention relates generally to the field of robotic massage systems and more specifically relates to a robotic massage table and massage mechanism that uses rollers to massage a user's back. A user may select the areas of the back which they would like to be massaged and simply lay in the prone position for a wonderful massage.

2. Description of the Related Art

A massage involves manipulating and acting on a persons' body with pressure through using tension, motion, or vibration. Massages can be done manually or mechanically. The general purpose of a massage is to release tension, promote relaxation, and improve physical wellbeing. A mechanical massage may be performed by a robotic massage chair. Conventional robotic massage chairs may not create enough pressure for a user due to the force of gravity on a user being the major pressure force. As such, an improved robotic massage device with improved pressure quantity and quality is needed.

Ideally, a robotic massage system should provide good massage for the user and, yet would operate reliably and be manufactured at a modest expense. Thus, a need exists for a reliable mechanical robotic massage system.

BRIEF SUMMARY OF THE INVENTION

The present invention provides a novel robotic massage system. The general purpose of the present invention, which will be described subsequently in greater detail is to provide a robotic massage table and massage mechanism with which a user may lie in a prone position to receive a back massage. The user may select from a variety of settings and the massage mechanism may have a variety of roller type massage attachments.

The present invention comprises a massage table, support members and a robotic massage mechanism. The massage table securely attaches to the massage mechanism via the support members. The support members and massage table in congruence provide the stabilizing components to allow the massage mechanism to correctly operate.

The massage mechanism comprises a body, a power cable, and manipulation arms. Support members attach to the massage mechanism such that the massage mechanism is disposed directly above a massage table and is advantageously applied to a user. The body of the massage mechanism comprises the necessary mechanics to move the manipulation arms in a plurality of different positions, at different speeds, and with different amounts of pressure. The manipulation arms move in a plurality of different configurations corresponding with the mechanics of the body of the massage mechanism.

The massage table comprises support legs, a support frame, steps, a power cable, a padded covering, and a control panel. The padded covering comprises a face rest such that a user may lie onto in the prone position without constricting their breathing. The padded covering comprises a padded area that partially absorbs the pressure pushing down on a user when the present invention is in use.

The support members couple to the massage mechanism such that when coupled they act as one rigid member. The control panel of the massage table comprises software that controls the functions of the massage mechanism. A user selects from a number of massage options such as shoulder, spine, or lower back via the control panel. A user also selects the pressure strength and length of time the massage takes place.

Prior to starting a massage, it is necessary for the user to attach one or more corresponding massage attachment member(s) to the massage mechanism that correspond to the massage setting selected on the control panel.

A plurality of different sized and shaped attachment members are provided with the present invention. The attachment members are easily attached and detached to the manipulation arms of the massage machine as needed. A roller type attachment member, as comprises different sized tubular rollers that are spaced apart from each other. The attachment members embody shapes including, but not limited to a sphere, a cube, a prism, and other three-dimensional polyhedron forms. When applied to a user's body, the tubular rollers roll in any direction along a user's back to provide a back massage corresponding to the selected treatment chosen on the control panel. The present invention is useful for home user, chiropractors, doctors, massage therapy, physical therapy and sports therapy.

The massage system includes a programmable massage table in conjunction with a programmable massage mechanism.

BRIEF DESCRIPTION OF THE DRAWINGS

The figures which accompany the written portion of this specification illustrate embodiments and method(s) of use for the present invention, a massage system, constructed and operative according to the teachings of the present invention.

The various embodiments of the present invention will hereinafter be described in conjunction with the appended drawings, wherein like designations denote like elements.

DETAILED DESCRIPTION

Figure 1:
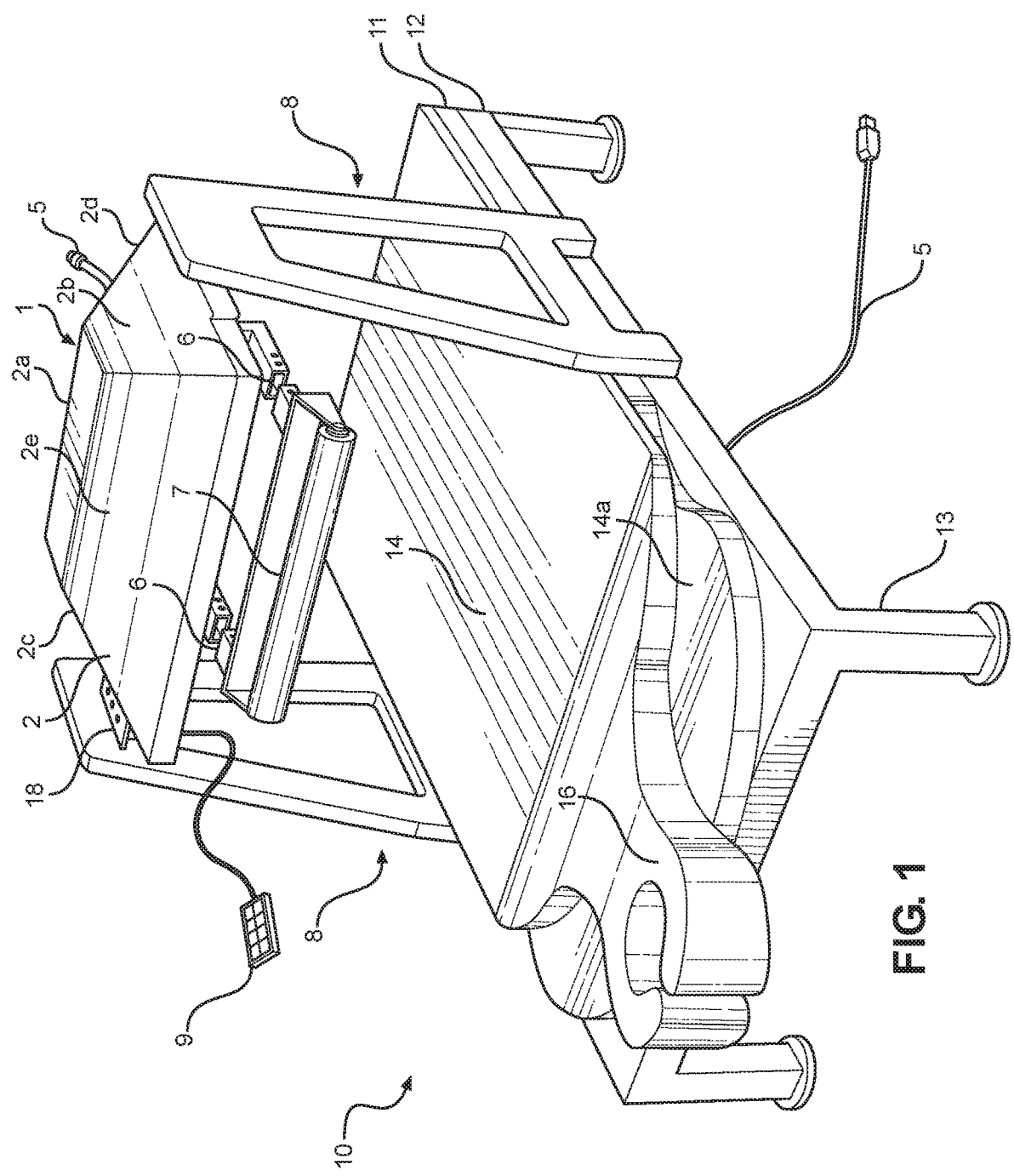
FIG. 1 shows a perspective view illustrating a massage system according to an embodiment of the present invention.

As discussed above, embodiments of the present invention relate to a massage system and more particularly to a back-massage table and machine system.

Referring to the drawings by numerals of reference there is shown in FIG. 1-9, a massage mechanism 1 having a main body 2. Main body 2 typically has a top 2a, a right side 2b, a left side 2c, back side 2d and front side 2e which together define an interior volume. A motor 3 is located within the interior volume of the main body 2. It is envisioned that the motor 3 will be attached to either the top 2a or optionally will be suspended within the interior volume of the main body 2 by braces attached to the interior sides. A plurality of linkages 4 are configured to be mechanically and individually attached to the motor 3 and are adapted to be moved in a plurality of different directions via the motor 3. The linkages are an assembly of bodies or links connected by joints. The most common joints for linkage systems are revolute or hinged and are capable of moving in complicated ways.

A power source 5 in the form of a conventional electrical cord configured to be attached to a wall outlet is further configured and connected to the motor 3 to supply the power to run the massage mechanism 1.

A plurality of hollow tubular manipulation arms 6 are connected to the respective plurality of linkages 4 and are adapted to move in a plurality of different directions. At least one massage attachment 7 is connected to at least one of the manipulation arms 6 and is adapted to be moved in a plurality of different directions to massage a user. Typically, a pair of manipulation arms 6 are present wherein each arm 6 is located adjacent to the right side 2b and left side 2c of the main body 2 as can be seen in FIG. 2. Each arm 6 has a vertical section 6a and a horizontal section 6b. The vertical section 6a is connected to a corresponding one of the linkages 4. The horizontal section 6b is connected to the massage attachment 7 as will be described in a later section.

Figure 2A:
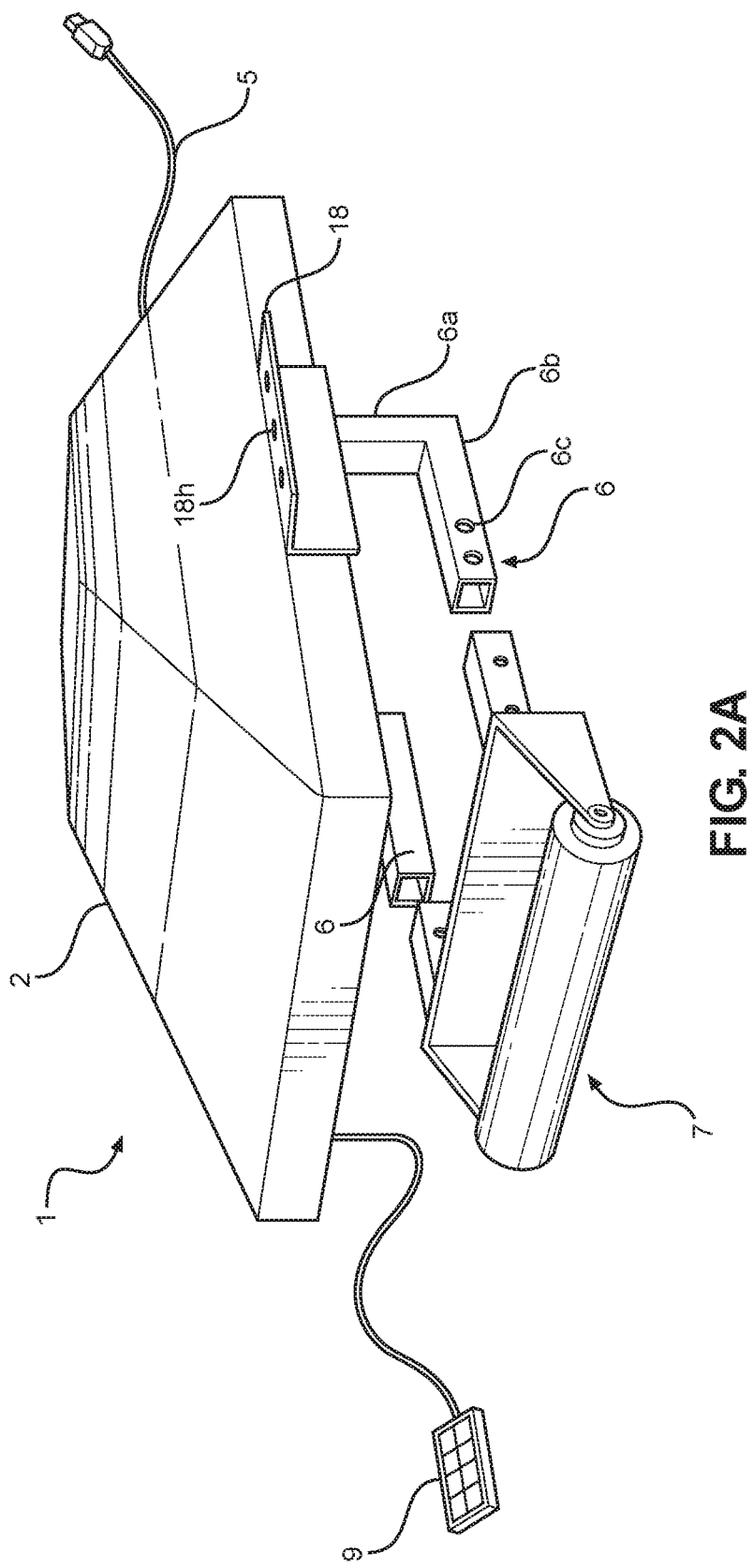
FIG. 2a is a perspective view illustrating the linkage of the massage mechanism of the present invention.
Figure 2B:
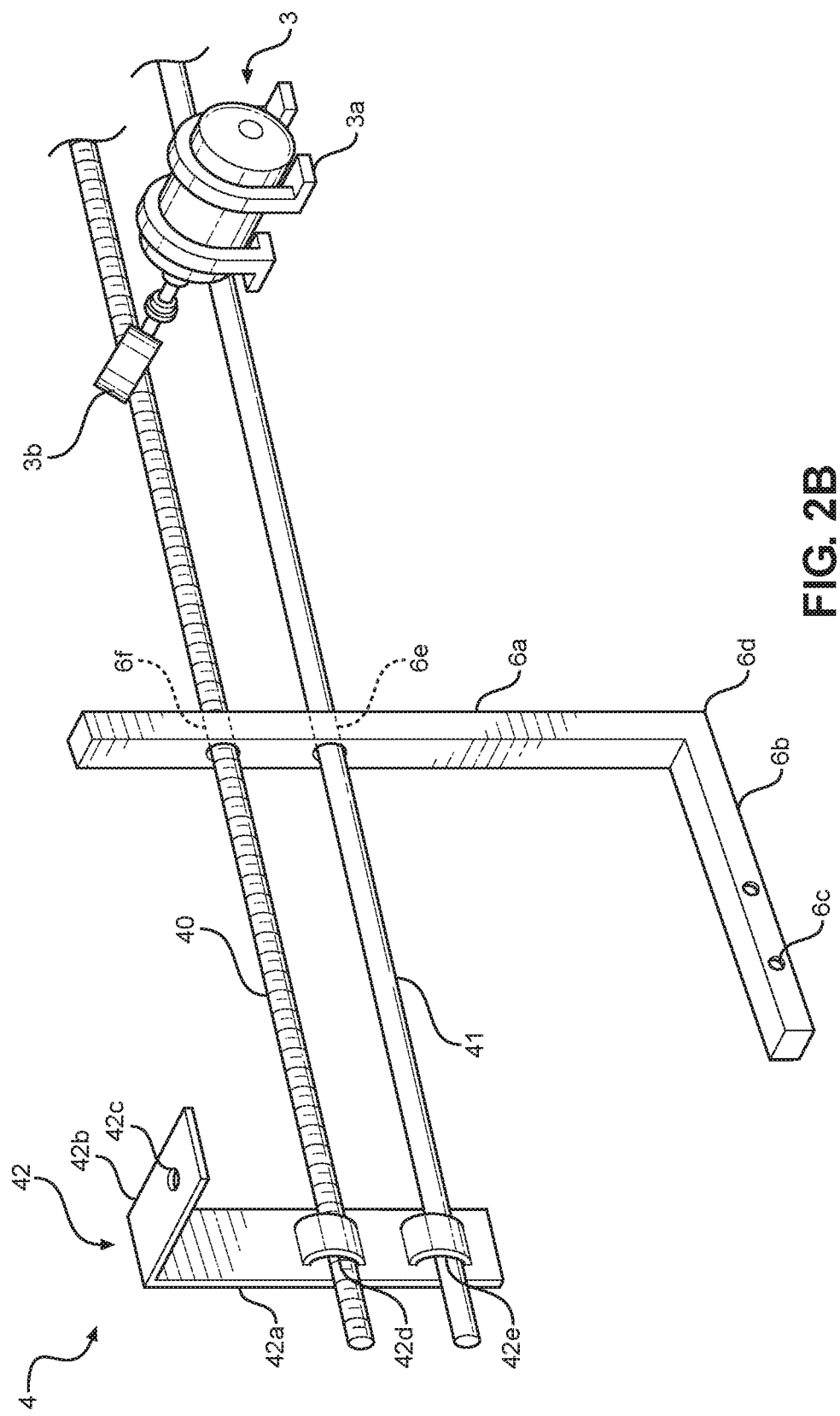
FIG. 2b is a perspective view illustrating the linkage of the massage mechanism of the present invention.

In an exemplary embodiment, as illustrated in FIG. 2a, it is contemplated that the linkages 4 are comprised of a guide rod 41 and a screw threaded rod 40 suitably mounted within the interior volume of the main body 2. One suitable mounting may be that of mounting brackets 42. Each mounting bracket 42 includes a depending portion 42a and a disposed flange 42b extending therefrom. The disposed flange 42b has an aperture 42c for the receipt of a suitable fastener for securement to the main body 2. The depending portion 42a has a bearing 42d which receives an end portion of the threaded rod 40 such that the threaded rod 40 is rotatably supported in place. The depending portion 42a is further provided with a bearing 42e which fixedly receives an end portion of the guide rod 41.

While FIG. 2a shows only one mounting bracket 42 it is understood that there is at least another mounting bracket 42 (not shown) provided to support the opposed end portions of the guide rod 41 and screw threaded rod 40. The vertical section 6a of the manipulation arms 6 comprises a threaded aperture 6f and a through hole 6e. The guide rod 41 is slidably disposed in the through hole 6e and serves to guide and prevent any rotational movement of the vertical section 6a. The threaded rod 40 is slidably and threadedly engaged with the threaded aperture 6f such that upon rotation of the threaded rod 40 the manipulation arm 6 is advanced either forwardly or backwardly depending upon the direction of rotation.

For enabling the rotation of the threaded rod 40 the motor 3 is provided with a mounting arrangement 3a such that the motor 3 may be conveniently secured to the interior of the main body 2. Disposed upon the motor output shaft is a suitable gearing 3b meshing with the threads of the threaded rod 40. Upon actuation of the motor 3 the gearing 3b imparts rotational movement to the threaded rod 40, which by the engagement with the threaded aperture 6f, enables the translational movement of the manipulation arm 6. The manipulation arms 6 may be suitably interconnected, such as by an extending member (not shown), whereby the movements of the manipulation arms 6 will be in tandem. In this case, only one manipulation arm 6 will incorporate the use of the threaded rod 40 and guide rod 41.

It is also within the scope of the invention for each of the manipulation arms 6 to have a linkage 4 comprised of the guide rod 41 and screw threaded rod 40 as set forth above. In this case the motor 3 may be suitably arranged by known means to rotate each threaded rod 40 in tandem. In this case the use of the extending member to interconnect the manipulation arms 6 will not be used. Alternately, the linkage 4 of one of the manipulation arms 6 may use the guide rod 41 in lieu of a screw threaded rod 40, or eliminate the screw threaded rod 40 altogether, with the arms 6 interconnected by the extending member as set forth above. This provides for a simplification of the linkage 4 while providing the guiding function afforded by the use of the guide rod 41 for added stability.

The vertical section 6a and the horizontal section 6b of the manipulation arms intersect at a corner portion 6d. The corner portion 6d may be provided with a hinge or pivot arrangement allowing for selective rotational movement of the vertical section 6a relative to the horizontal section 6b. A spring (not shown) may be provided having opposed ends with one end secured to the vertical section 6a and its other opposed end secured to the horizontal section 6b. This arrangement provides for a biasing such that the distal end of the horizontal section 6b may move in a vertical direction.

Figure 4:
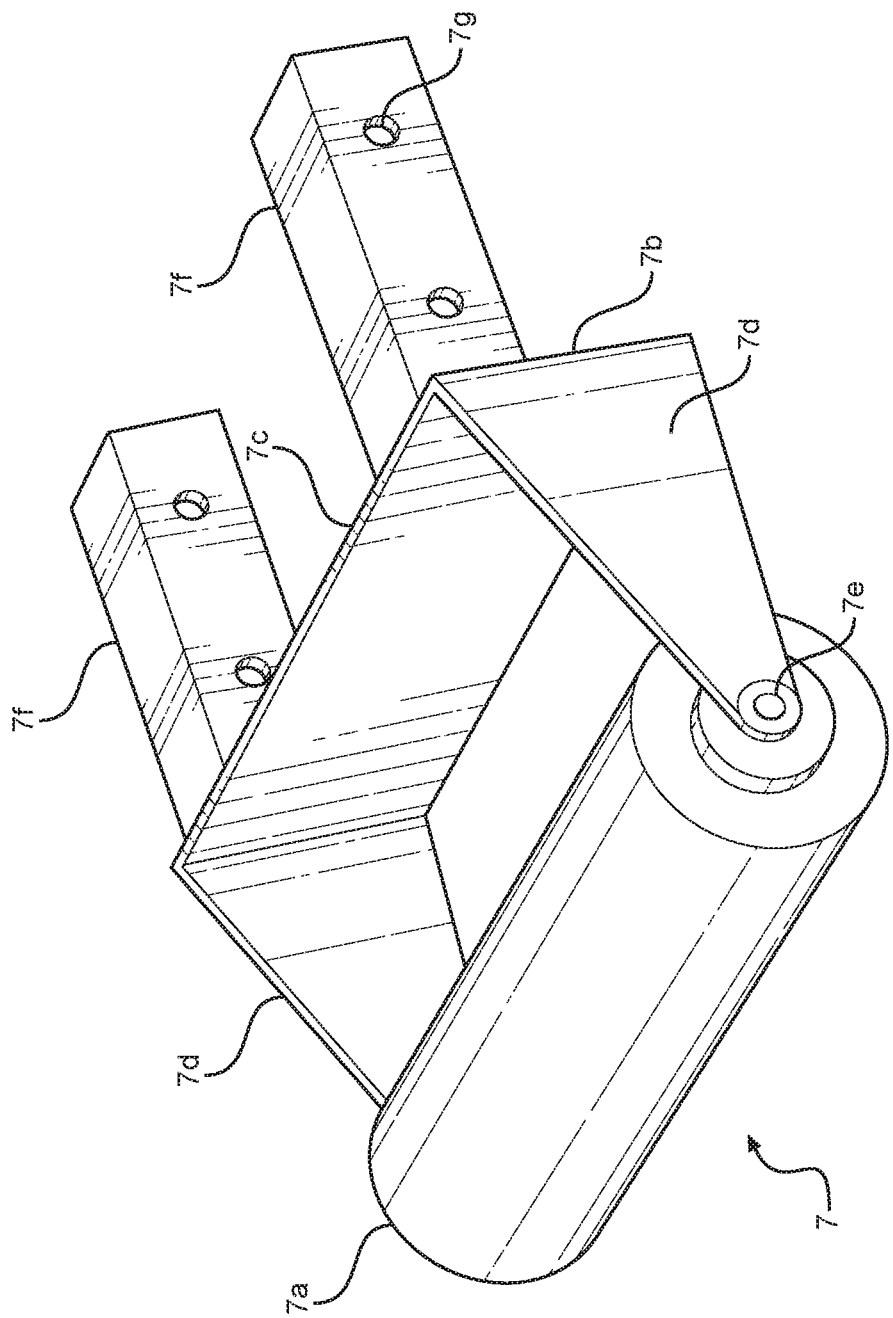
FIG. 4 is a perspective view illustrating the massage attachment of the massage system according to the present invention.

The massage attachment 7 may be formed as a tubular roller 7a having a polyhedron shape chosen from a list of shapes consisting of a sphere, a cube and a prism. Referring to FIG. 4, a massage attachment 7 is shown which is typically used to provide a rolling pressure to the major width of a user's back and comprised of a C-shaped bracket 7b having a rear 7c, and two opposing sides 7d. The tubular roller 7a extends between the two opposing sides 7d and is held therebetween by a rod and fastener combination 7e which allows the roller 7a to freely roll.

At the rear side 7c, there are two connection pegs 7f which extend outwardly therefrom and which have apertures or indents 7g along the length thereof. The connection pegs 7f are configured to be inserted within the hollow tubular horizontal section 6b of the manipulation arms 6. A suitable fastener is then inserted in the holes 6c to connect with the apertures or indents 7g of the connection pegs 7f thereby holding the massage attachment 7 to the manipulation arm 6 for use.

Figure 3:
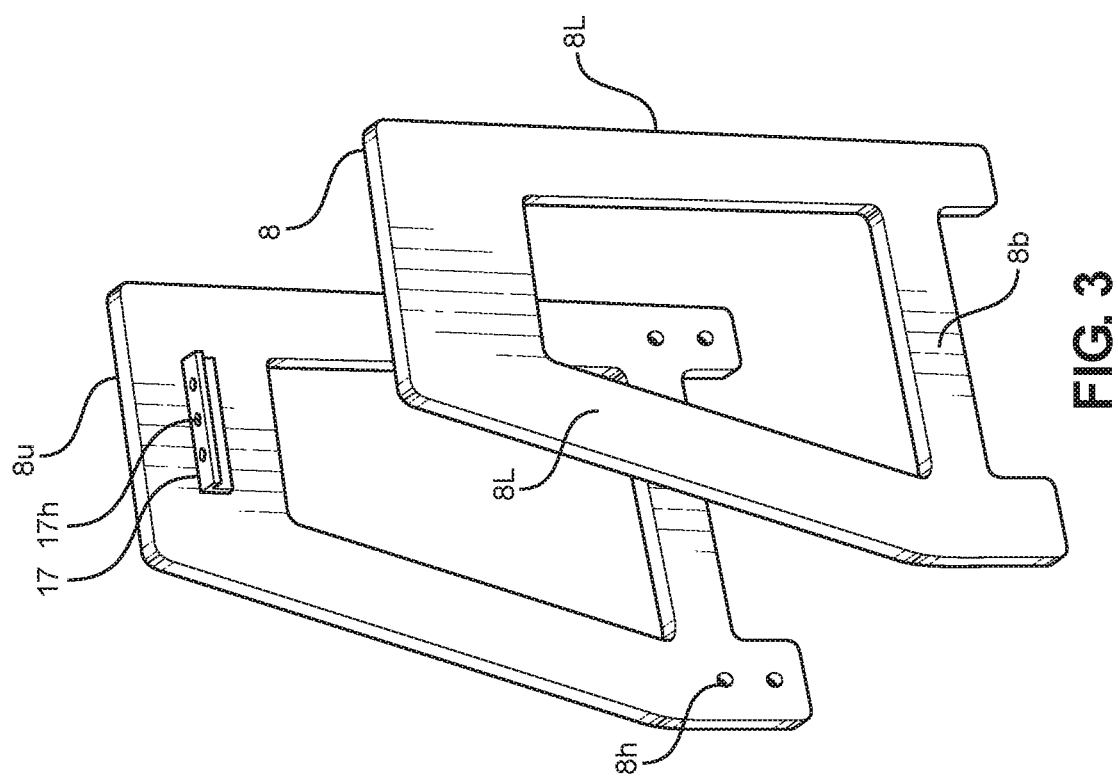
FIG. 3 is a perspective view illustrating the support members of the massage system according to the present invention.

In a first embodiment shown in FIGS. 1 and 3, a pair of support members 8 are attached to the main body 2 and are adapted to support and hold the massage mechanism 1 in predetermined positions relative to a massage table 11. The support members 8 are linear in cross-section and have an upper horizontal section 8u and a bottom horizontal section 8b spaced therefrom by two opposing legs 8L having holes 8h at their bottom ends. Upper horizontal section 8u has connected thereto an L-shaped bracket 17 having holes 17h on the horizontal flange thereof.

Main body 2 has attached to right side 2b and left side 2c L-shaped brackets 18 which correspond in shape and size to L-shaped brackets 17 on the pair of support members 8 and having on its horizontal flange corresponding holes 18h. The horizontal flanges of brackets 17 and 18 respectively are placed together and a suitable fastener is inserted through the holes 17h and 18h to thereby connect the massage mechanism 1 to the support members 8. Holes 8h in the bottom ends of opposing legs 8L receive suitable fasteners to connect support members 8 to opposite sides of the massage table 11 as shown in FIG. 1.

A controller 9 is attached to the motor 3 and is adapted to control the motor 3, the plurality of linkages 4 and the movements of any of the massage attachments 7.

The massage mechanism 1 is configured to be used as part of a massage system 10 which includes a massage table 11. The massage table 11 of the present invention includes a support frame 12 having support legs 13 and a padded covering 14. The padded covering 14 further includes a padded area 14a that is adapted to partially absorb pressure pushing down on a user via the massage attachments 7 when in use. The padded covering also includes a face rest 16 so that a user's face may be properly supported as a user lays face down upon the massage table 11.

Figure 7:
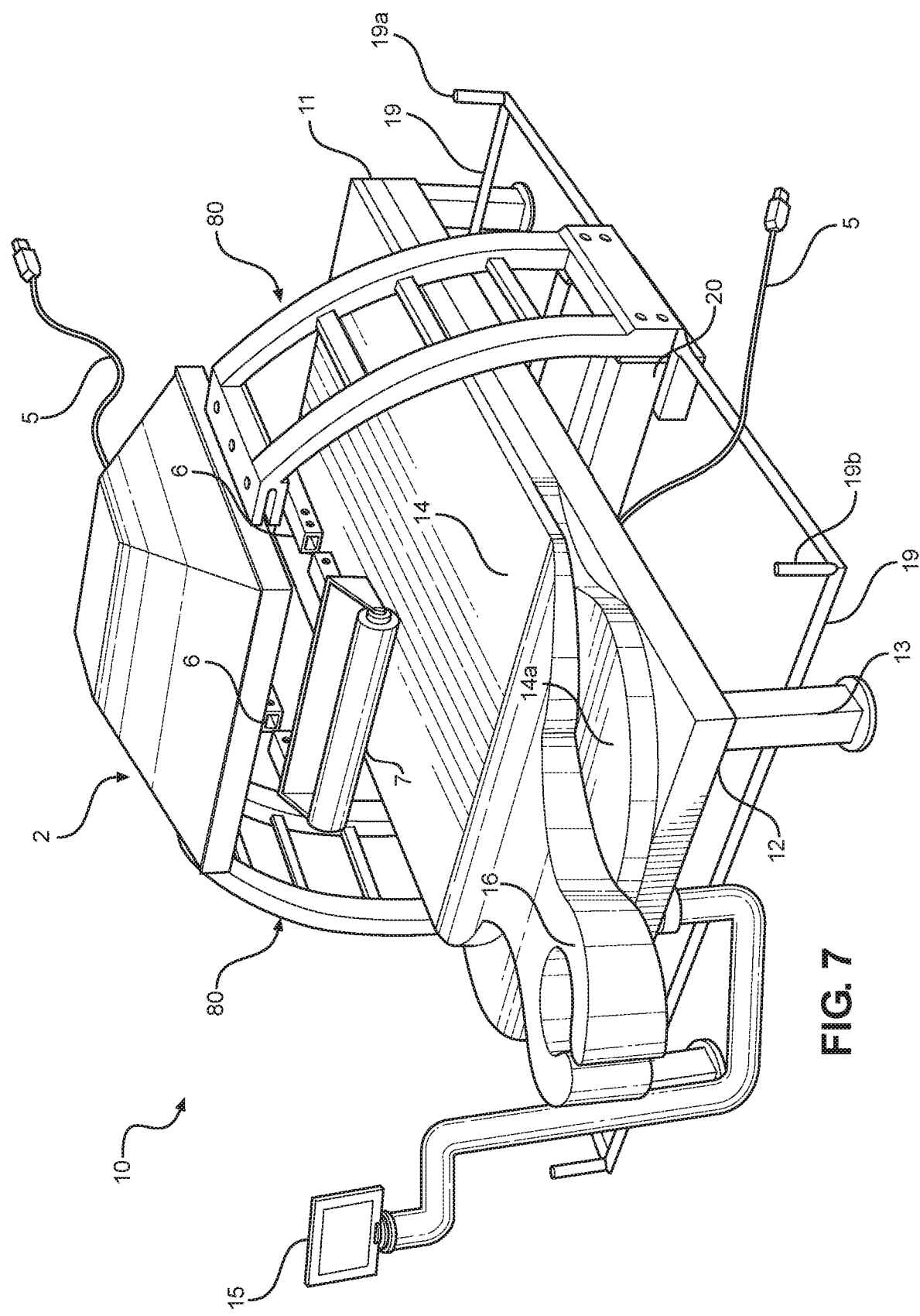
FIG. 7 is a perspective view illustrating a second embodiment of the present invention.
Figure 9:
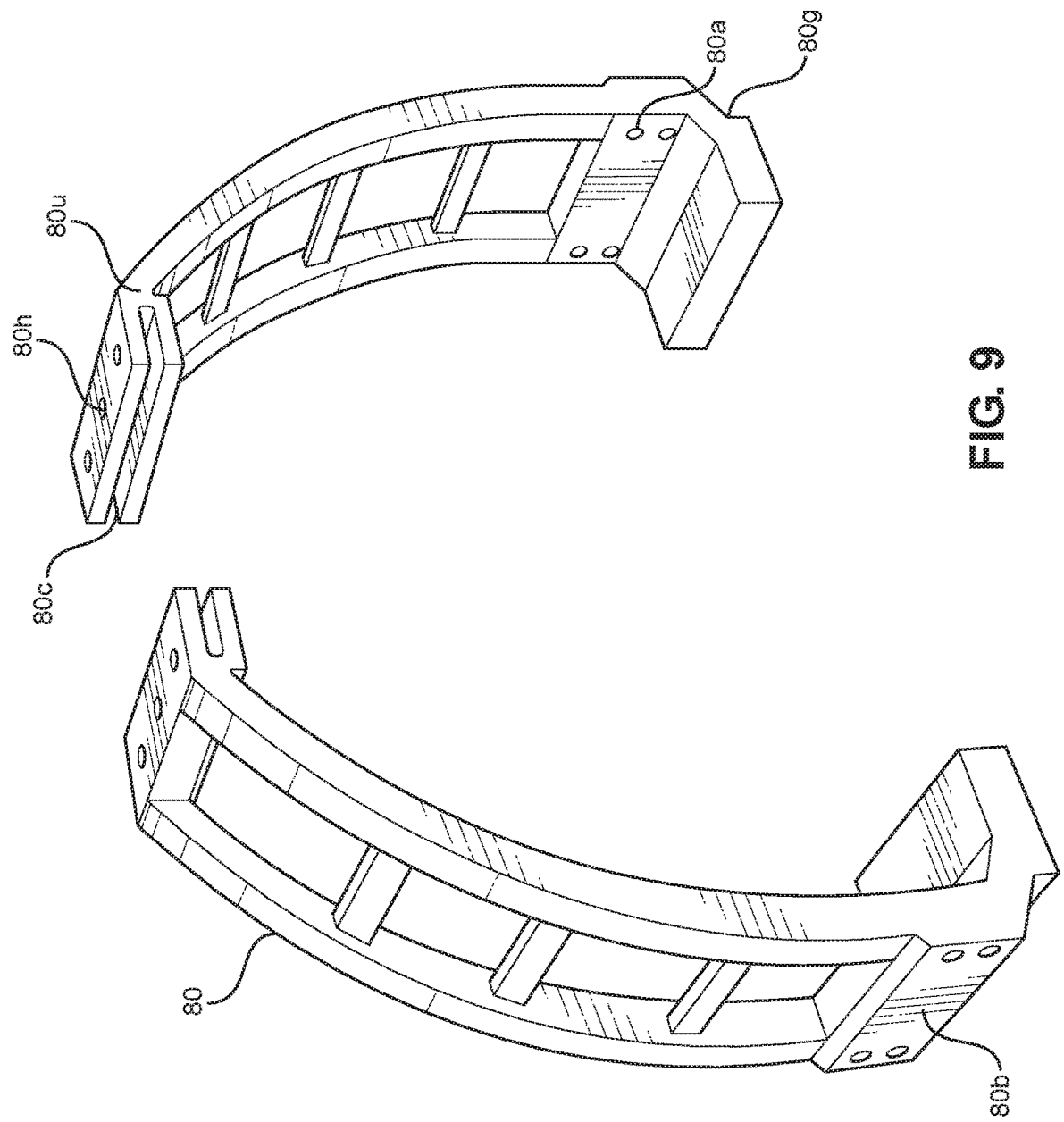
FIG. 9 is a perspective view illustrating the curved frame of the support members of the second embodiment.

A second embodiment is shown in FIGS. 7 and 9. A rail 19 surrounds the inner surface of support legs 13 of the massage table 11 and are connected thereto. The rail 19 extends beyond the width of the table 11. Stops 19a are proximate to the support legs 13, the purpose of which will be later described. Turning to FIG. 9, the opposed support members 80 are shown as being mirror images of each other. The support members 80 are each curved in a facing C-shape and each have an upper section 80u and a bottom section 80b. Upper section 80u is connected to opposite sides of the main body 2 of the massage mechanism 1.

Upper section 80u has a cleft 80c and holes 80h which cooperate with the horizontal flange of the L-shaped bracket 18 and the holes 18h therein on opposing sides of the main body 2. The horizontal flange of the L-shaped bracket 18 is slid into the cleft 80c and a suitable fastener is inserted through holes 18a and 80h to connect the massage mechanism 1 to the opposed support members 80.

The bottom 80b of opposed support members 80 rest on the rail 19 by way of a groove 80g. The bottom 80b of opposed support members 80 also have apertures 80a. A pair of brace members 20 extends between the bottom 80b of opposed support members 80 to provide stability. Suitable fasteners extend through apertures 80a into opposite ends of brace 20. As can be seen in FIG. 7, the opposed support members 80 rest upon and are able to slide upon the rail 19 to allow the massage mechanism 1 to translate linearly along the length of the massage table 11 to better suit the needs of a user. Stops 19a prevent the support members 80 from translating any further than the rails 19 allow.

Figure 8:
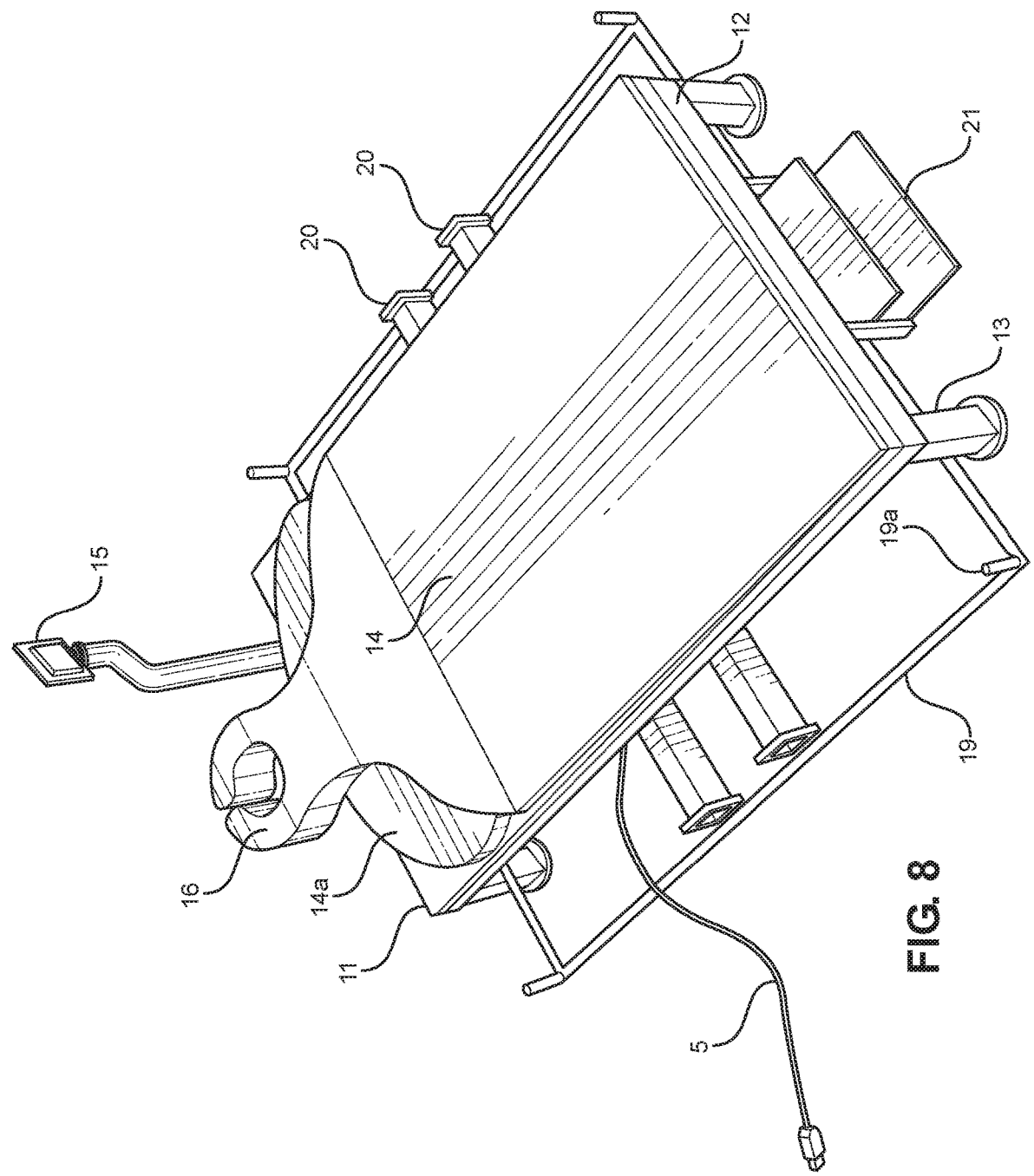
FIG. 8 is a perspective view illustrating the table of the second embodiment of the present invention.

Additionally, in the second embodiment, the massage table 11 further includes a control panel 15 connected to the support frame 12 which is electronically connected to and adapted to control the motor 3 and movements of the linkages 4 and any of the massage attachments 7 just like the controller 9. The control panel 15 is further equipped with computer software adapted to be programmed by a user in order to control the function of the motor 3 and movements of the linkages 4 and any of the massage attachments 7 for a massage session. A user selects from a number of massage options such as shoulder, spine, or lower back via the control panel 15. A user also selects the pressure strength and length of time the massage takes place. FIG. 8 illustrates the massage table 11 and shows steps 21 to help a user ascend to the massage table.

Figure 5:
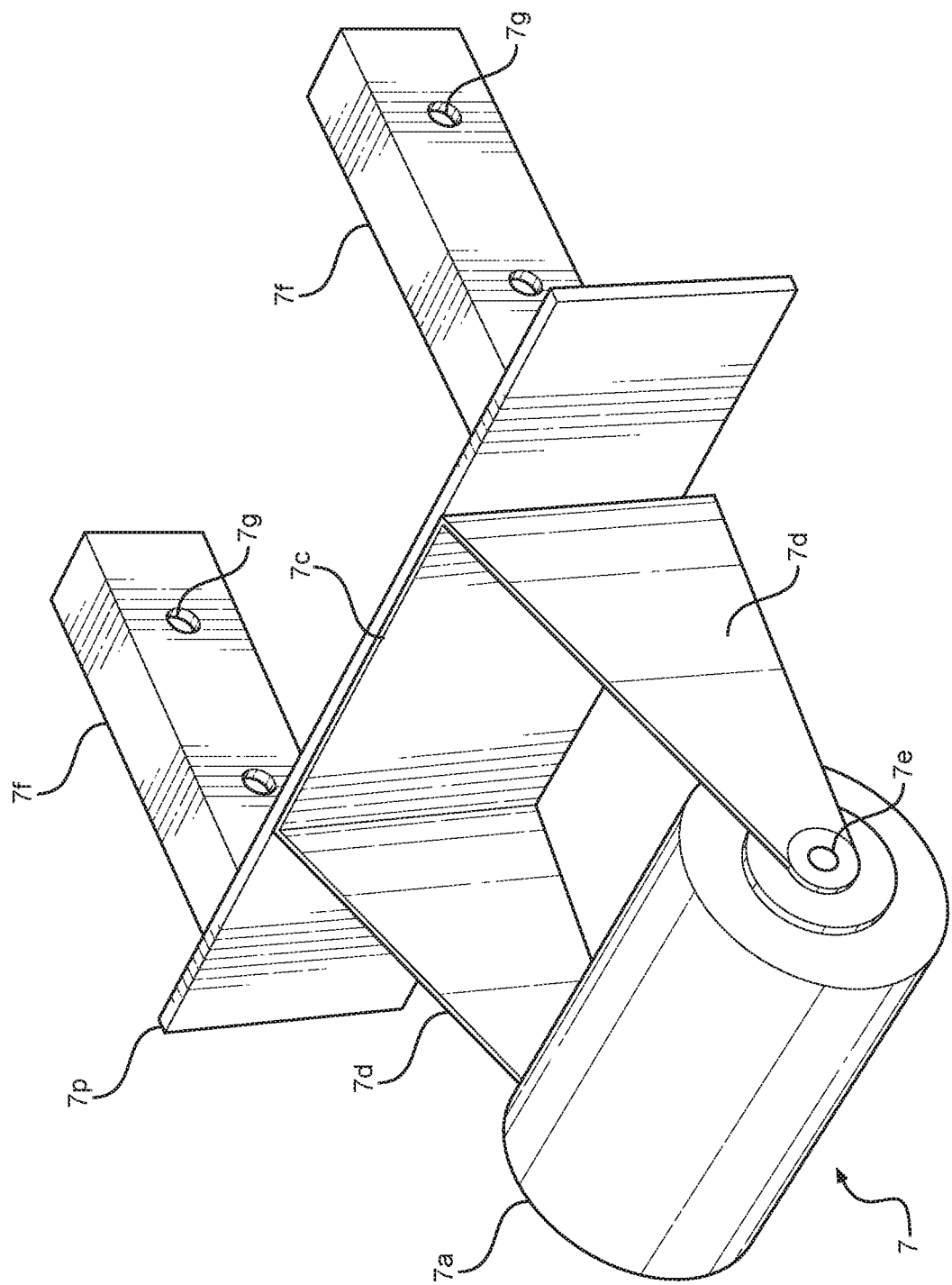
FIG. 5 is a perspective view illustrating a second massage attachment according to an embodiment of the present invention of FIG. 1.

Turning to the various embodiments of the massage attachments 7, the embodiment in FIG. 5 is useful for massaging the spinal column and has a shorter roller 7a which fits between the shoulder blades of most users. A shorter version of the C-shaped bracket 7b is also shown as having a shorter rear side 7c. The rear side 7c in the embodiment shown in FIG. 5 is attached to a plate 7p. The connection pegs 7f with their apertures 7g extend rearwardly from the plate 7p and connect with the manipulation arms 6 as previously described.

Figure 6:
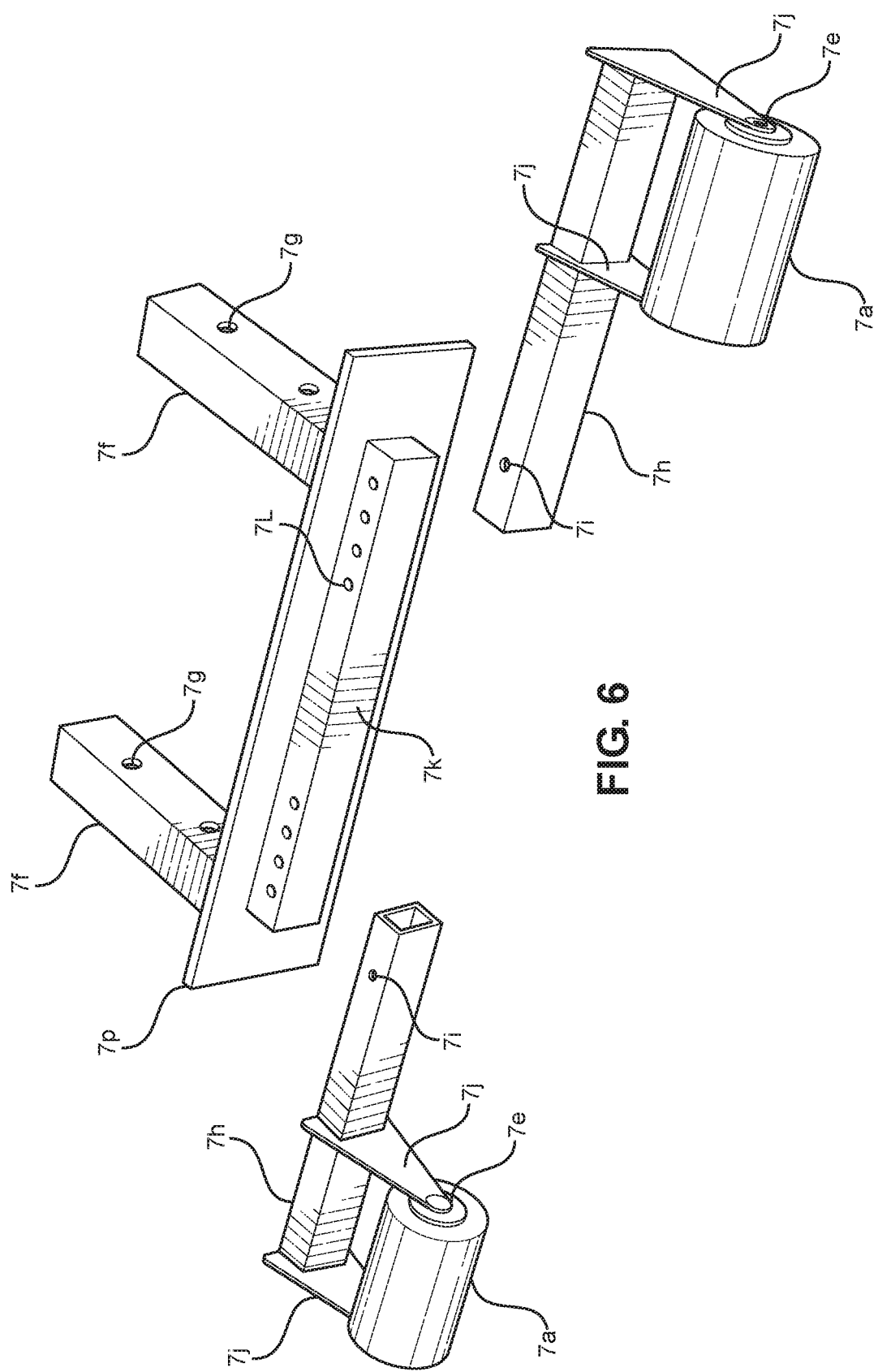
FIG. 6 is a perspective view illustrating a third massage attachment according to an embodiment of the present invention of FIG. 1.

The embodiment in FIG. 6 is useful for massaging the shoulder areas and has adjustable arms 7h to accommodate different sized users. Similar to the embodiment in FIG. 5, pegs 7f extend rearwardly from a plate 7p and connect with the manipulation arms 6 as previously described. The arms 7h have opposing plates 7j which operate in the same fashion as the opposing sides 7d shown in FIGS. 4 and 5 and as described above with the rod and fastener combination 7e extending through the roller 7a and fastened onto the opposing plates 7j.

Securely fastened to the plate 7p is a hollow bar 7k having a plurality of holes 7L. In operation, arms 7h slide into the hollow bar 7k such that the holes 7i match up with the holes 7L and are secured thereto by suitable fasteners whereby a user can adjust the distance between the two rollers 7a. Two massage attachments 7 will therefore be spaced from one another such that both shoulder blades may be massaged at the same time.

It is contemplated that a user will select the type of massage they want, for example; full back, shoulder blades, legs or spine and then choose the appropriate massage attachment 7 and fasten it to the manipulation arms 6. The user will then move the massage device 2 along the rails 19 such that the massage device 2 is positioned over the user to give the type of massage desired for the user. The stops 19a prevent the curved support members 80 from going off of the rails 19. The ability of the massage device 2 to move along the rails 19 with respect to the table 11 is particularly helpful since it can be adapted for users of different sizes and heights.

Upon reading this specification, it should be appreciated that, under appropriate circumstances, considering such issues as design preference, user preferences, marketing preferences, cost, structural requirements, available materials, technological advances, etc., other kit contents or arrangements such as, for example, including more or less components, customized parts, different color combinations, parts may be sold separately, etc., may be sufficient.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is:

1. A massage mechanism comprising:
   a main body including:
      a motor;
         wherein said motor is located within an interior volume of said main body; and
      a plurality of linkages;
         wherein said plurality of linkages are individually and mechanically attached to said motor and are adapted to be moved in a plurality of different directions via said motor;
   a power source;
      wherein said power source is connected to said motor and supplies power thereto;
   a plurality of manipulation arms;
      wherein said plurality of manipulation arms are connected to respective said plurality of linkages and are adapted to move in a plurality of different directions;
   at least one massage attachment;
      wherein said at least one massage attachment is connected to at least one of said plurality of manipulation arms and adapted to be moved in a plurality of different directions;
   a plurality of support members;
      wherein said plurality of support members are connected to said main body and are adapted to support and hold said massage mechanism in predetermined positions relative to a massage table.

2. The massage mechanism of claim 1, wherein said at least one massage attachment is formed as a tubular roller.

3. The massage mechanism of claim 2, wherein said tubular roller has a three dimensional polyhedron shape.

4. The massage mechanism of claim 2, wherein said tubular roller has a shape chosen from a list of shapes consisting of a sphere, a cube, and a prism.

5. The massage mechanism of claim 1, wherein there are two said massage attachments spaced from one another.

6. The massage mechanism of claim 1, further comprising a controller connected to said motor member and adapted to control said motor, said plurality of linkages, and said movements of said at least one massage attachment.

7. A massage system comprising:
   a massage table including:
      a support frame;
      a plurality of support legs;
         wherein said plurality of support legs are connected to said support frame and hold said support frame in a secure position above a support surface; and
      a padded covering;
         wherein said padded covering is placed upon said support frame; and
   a massage mechanism comprising:
      a main body including:
         a motor;
            wherein said motor is located within an interior volume of said main body; and
         a plurality of linkages;
            wherein said plurality of linkages are individually and mechanically attached to said motor and are adapted to be moved in a plurality of different directions via said motor;
      a power source;
         wherein said power source is connected to said motor and supplies power thereto;
      a plurality of manipulation arms;
         wherein said plurality of manipulation arms are connected to respective said plurality of linkages and are adapted to move in a plurality of different directions;
      at least one massage attachment;
         wherein said at least one massage attachment is connected to at least one of said plurality of manipulation arms and adapted to be moved in a plurality of different directions;
      a plurality of support members;
         wherein said plurality of support members are connected to said main body at respective proximal ends thereof;
         wherein said plurality of support members are releasably and movably connected to said support frame of said massage table at respective distal ends thereof; and
         wherein said plurality of support members are adapted to support and hold said massage mechanism in predetermined positions relative to a massage table.

8. The massage system of claim 7, wherein said at least one massage attachment is formed as a tubular roller.

9. The massage system of claim 8, wherein said tubular roller has a three dimensional polyhedron shape.

10. The massage system of claim 8, wherein said tubular roller has a shape chosen from a list of shapes consisting of a sphere, a cube, and a prism.

11. The massage system of claim 7, wherein there are two said massage attachments spaced from one another.

12. The massage system of claim 7, wherein said massage table further includes a control panel connected to said support frame and electronically connected to said motor member and adapted to control said motor, said plurality of linkages, and said movements of said at least one massage attachment.

13. The massage system of claim 12, wherein said control panel includes computer software adapted to control the function of said motor and movements of said linkages and massage attachments.

14. The massage system of claim 7, wherein said padded covering includes a face rest adapted such that a user may lie on said padded covering in a prone position without constricting their breathing.

15. The massage system of claim 14, wherein said padded covering includes a padded area that is adapted to partially absorb pressure pushing down on a user via said at least one massage attachment when in use.

* * * * *